(12) United States Patent
Dandekar et al.

(10) Patent No.: US 8,480,130 B2
(45) Date of Patent: Jul. 9, 2013

(54) ENGINE CRADLE WITH DEFLECTOR DEVICE

(75) Inventors: Bhushan W. Dandekar, Rochester Hills, MI (US); Balaji J, Bangalore (IN); Sajid Syed, Troy, MI (US); Manoj Marella, Bangalore (IN); Balbir Singh Sanga, Ajax (CA)

(73) Assignee: GM Global Technology Operations LLC, Detorit, MI (US)

( * ) Notice: Subject to any disclaimer, the term of this patent is extended or adjusted under 35 U.S.C. 154(b) by 0 days.

(21) Appl. No.: 13/250,325

(22) Filed: Sep. 30, 2011

(65) Prior Publication Data
US 2013/0081897 A1 Apr. 4, 2013

(51) Int. Cl.
*B62D 7/22* (2006.01)
(52) U.S. Cl.
USPC .......................................................... 280/784
(58) Field of Classification Search
USPC ................... 280/784, 854; 293/114, 150, 118
See application file for complete search history.

(56) References Cited

U.S. PATENT DOCUMENTS 5,611,568 A * 3/1997 Masuda ........................ 280/784
7,926,847 B2 * 4/2011 Auer et al. .................... 280/784

* cited by examiner

*Primary Examiner* — John Walters
*Assistant Examiner* — James Triggs

(57) ABSTRACT

An engine cradle mounting an engine in a vehicle has left and right side members spaced laterally apart on opposite sides of the engine, a rear cross member having right and left ends attached respectively to the left and right side members, and a front cross member having left and right ends attached respectively to the left and right side members. Body mounts are provided on the left and right ends of the front cross member for bolting the cradle to the vehicle body. Left and right deflector devices are mounted on the cradle, and each includes an impact receiving member that projects outwardly from the cradle to receive an impact load, and a brace member that extends between the cradle and the impact receiving member to brace the impact receiving member and provide a load path transferring the impact load into the cradle.

15 Claims, 3 Drawing Sheets

ENGINE CRADLE WITH DEFLECTOR DEVICE

FIELD OF THE INVENTION

The present invention relates to an engine cradle for a motor vehicle and more particularly relates to low deflector devices that transfer an impact load into the engine cradle.

BACKGROUND OF THE INVENTION

Some motor vehicles are built on a full frame that includes left and right frame rails connected by cross members so as to form a ladder-like frame structure. In this type of construction, the frame and the vehicle body are constructed seperately, and each is a complete unit by itself. The left and right frame rails run the length of the vehicle between the front bumper and the back bumper. The front and rear axles are mounted on the frame. The engine and transmission are mounted on the frame. The vehicle body is married to the frame and includes a bulkhead that separates the occupant compartment from the engine compartment. The fenders are then mounted on the frame and the bulkhead to surround the engine.

Other motor vehicles have the frame and the body integrated together into a single one-piece structure that is comprised of a large number of parts that are welded together so that the front fenders, radiator support, and bulkhead are joined together as a unit. In this way, the one-piece body and frame unit defines both the engine compartment and the passenger compartment. This type of body construction is commonly referred to as a unibody construction, or an integral frame and body construction. In this unibody construction, the engine is mounted on an engine cradle, and then the engine cradle is bolted to the underside of the unibody construction. In the unibody construction, the entire single piece structure performs as a load-carrying member that reacts to all loads experienced by the vehicle, including road loads, cargo loads and impact loads. It would be desirable to provide alternative vehicle constructions that would provide new and different management of impact loads in which loads that would otherwise be transferred into the unibody are, instead, transferred into the cradle.

SUMMARY OF THE INVENTION

An engine cradle mounting an engine in a vehicle has left and right side members spaced laterally apart on opposite sides of the engine, a rear cross member having right and left ends attached respectively to the left and right side members, and a front cross member having left and right ends attached respectively to the left and right side members. Body mounts are provided on the left and right ends of the front cross member for bolting the cradle to the vehicle body. Left and right deflector devices are mounted on the cradle, and each includes an impact receiving member that projects outwardly from the cradle to receive an impact load, and a brace member that extends between the cradle and the impact receiving member to brace the impact receiving member and provide a load path transferring the impact load into the cradle.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
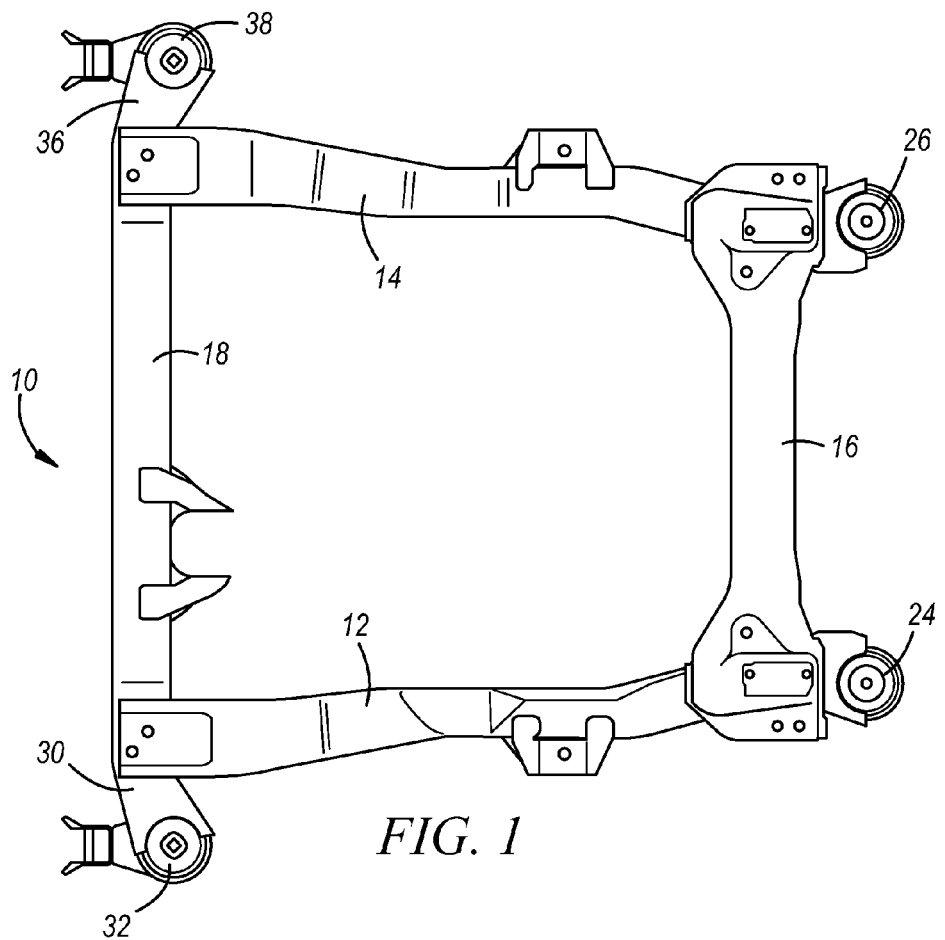
FIG. 1 is a plan view of a conventional engine cradle.

Referring to FIG. 1, an engine cradle, generally indicated at 10, for a motor vehicle includes a left side member 12, a right side member 14, a rear cross member 16, and a front cross member 18. The left side member 12 and right side member 14 are laterally spaced apart and connected at their rear ends to the rear cross member 16 by bolts or welds. A vehicle body mount 24 is mounted at the rear end of the left side member 12 and a body mount 26 is mounted at the rear end of the right side member 14. The left side member 12 and right side member 14 are connected together at their front ends to the front cross member 18 by bolts or welds. As seen in FIG. 1, the front cross member 18 has a left end 30 upon which a body mount 32 is provided. Likewise, the front cross member 18 has a right-hand end 36 upon which a body mount 38 is provided.

During assembly of the motor vehicle, a vehicle engine and transmission will be mounted on the cradle 10. In addition, the suspensions for the left and right front wheels will be mounted on the cradle 10. Then, the cradle 10 will be married onto the underbody of an integral frame and body structure by installing bolts through the body mounts 24, 26, 32, and 38.

Figure 2:
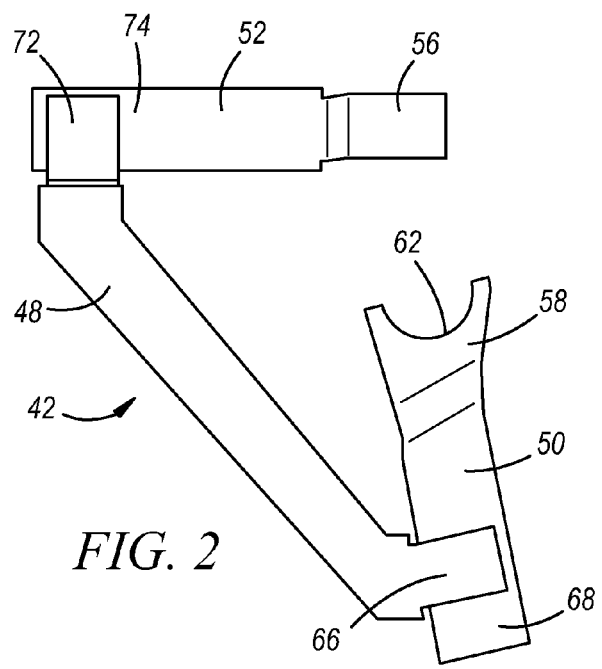
FIG. 2 is a plan view of a deflector device for attachment to the cradle of FIG. 1.
Figure 3:
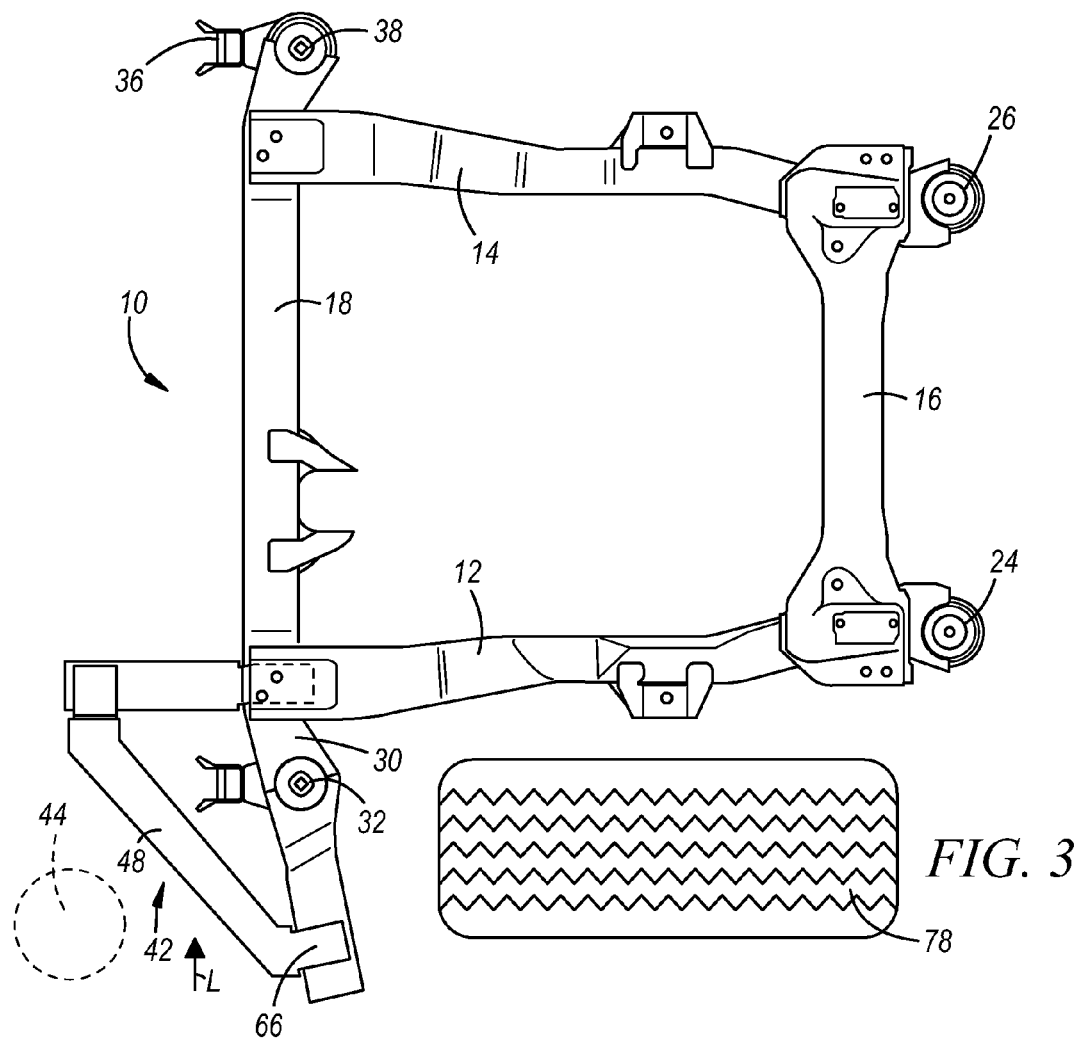
FIG. 3 shows the deflector device of FIG. 2 attached to the cradle of FIG. 1.

A deflector device, generally indicated at 42, is shown in FIGS. 2 and 3 for modifying the performance of the motor vehicle in the event of an impact with a pole 44. The deflector device 42 includes an impact receiving member 48, a brace member 50, and a side member extension 52. Each of these members 48, 50, and 52 are preferably of tubular construction, similar to the tubular construction of the side members 12 and 14 and the cross members 16 and 18. The members can be made of conventional round, or square, or rectangular rolled metal tube with a longitudinal extending seam, or the members can be C-shaped channels which are welded together along longitudinal seams.

The side member extension 52 has a rear end 56 that is welded or bolted or otherwise attached to the front end of side member 12. An inboard end 58 of brace member 50 has a semicircular receptacle 62 that fits around the round shape of the body mount 32 and is suitably welded to either the body mount 32 or the left end 30 of the front cross member 18. The impact receiving member 48 has an outboard end 66 that is welded or bolted to an outboard end 68 of the brace member 50. The impact receiving member 48 also has inboard end 72 that is welded or bolted to a forward end 74 of the side member extension 52. As seen in FIGS. 2 and 3, the impact receiving member 48 extends at a rearward angle of approximately 45 degrees with respect to the side member 12 and also 45 degrees with respect to the front cross member 18. As seen in FIG. 3, the outboard end 66 of the impact receiving member 48 is positioned adjacent or outboard of a vehicle wheel 78

In the event of experiencing the pole 44 during forward travel of the vehicle, the impact receiving member 48 will engage the pole 44 and receive the load and impose the load laterally on the cradle 12 in the direction of the arrow L of FIG. 3. This lateral load can induce the vehicle to slide away laterally from the pole 44. In addition, the impact receiving member 48 will receive the impact load that would otherwise transfer into the vehicle wheel 78 and other vehicle structures that lie outboard of the cradle side member 12.

Figure 4:
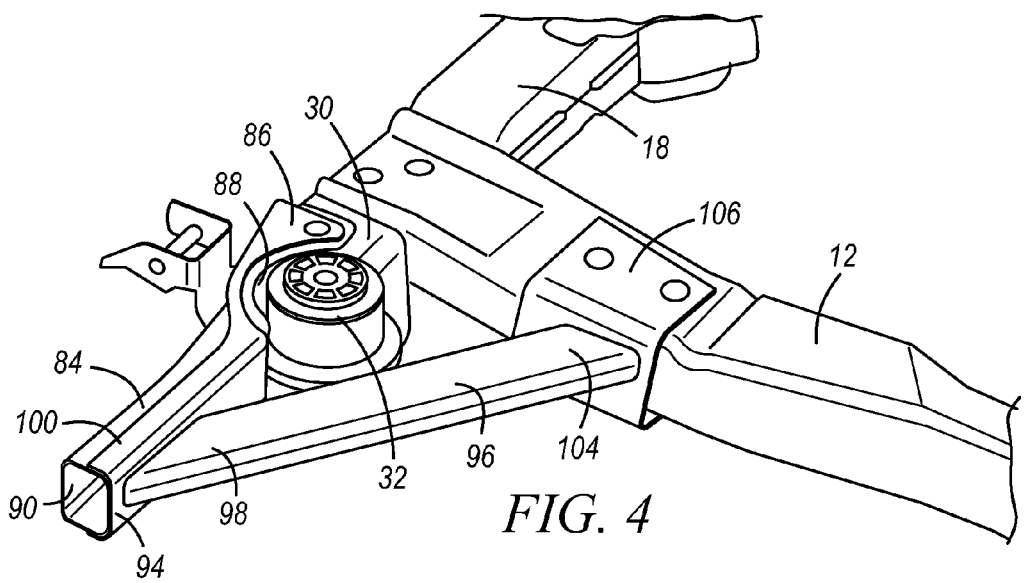
FIG. 4 shows an alternative construction of the deflector device.

FIG. 4 shows another embodiment in which impact receiving member 84 has a inboard end 86 that is attached to the left end 30 of cross member 18. As seen in FIG. 4, the impact receiving member 84 has a semicircular receptacle 88 that partially surrounds the body mount 32. The impact receiving member 84 is constructed of two C-shaped metal channels 90 and 94 that are interleaved and welded together. A brace member 96 has an outboard end 98 that is welded to an outboard end 100 of the impact receiving member 84. The brace member 96 has an inboard end 104 that is attached to the side member 12 by a U-shaped mounting bracket 106. As seen in FIG. 4, the impact receiving member 84 extends outwardly from the side member 12 at a 90 degree angle and is essentially an outboard extension of the front cross member 18. FIG. 4 also shows that the brace member 96 is extending at about a 45 degree angle between the impact receiving member 84 and the side member 12 to effectively brace the impact receiving member 84 against bending rearwardly. In operation, in the event of the vehicle experiencing the pole 44, the impact load will be received by the impact receiving member 84 and transferred into the cradle 10 by the brace member 96. As in the embodiment of FIGS. 1-3, the impact receiving member 84 is positioned just forwardly of the vehicle wheel 78, and, accordingly, impact loads that would otherwise be transferred into the vehicle wheel 78 and other vehicle structures are transferred laterally into the cradle 10.

Figure 5:
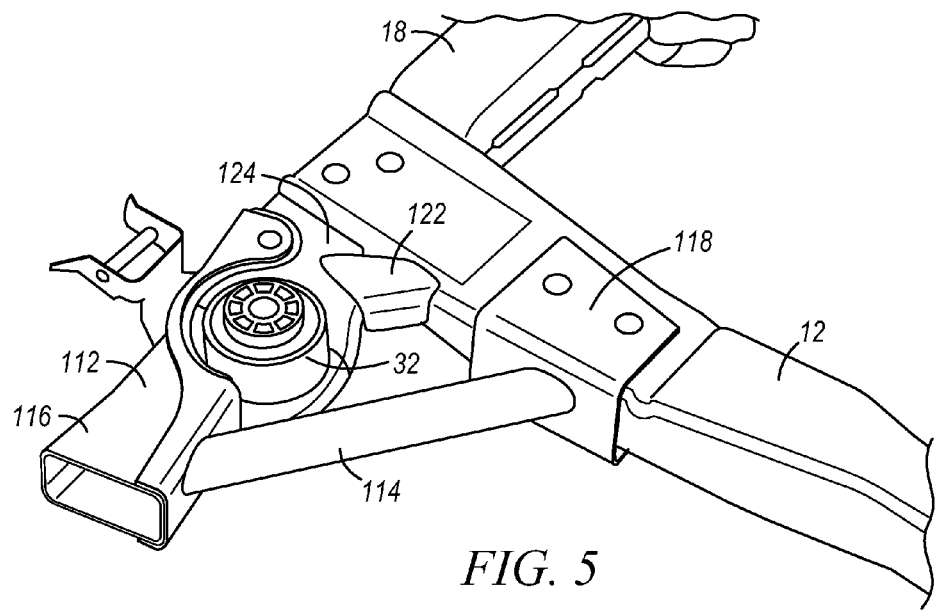
FIG. 5 shows another alternative construction of the deflector device.

FIG. 5 shows another embodiment of the invention, constructed in a manner generally similar to that of FIG. 4. However, in FIG. 5, an impact receiving member 112 is angled rearwardly at an angle of about 30 degrees from the front cross member 18 and about 60° from the side member 12. A brace member 114 extends between an outboard end 116 of the impact receiving member 112 and a mounting bracket 118 which is connected to the side member 12 of cradle 10. In addition, FIG. 5 shows a supplemental brace member 122 that is welded between an inboard end 124 of impact receiving member 112 and the side member 12 of cradle 10. Thus, it is seen in FIG. 5 that the supplemental brace member 122 is located more generally forward than the brace member 114 and will assist in adding structural integrity and impact resistance to the impact receiving member 112.

Figure 6:
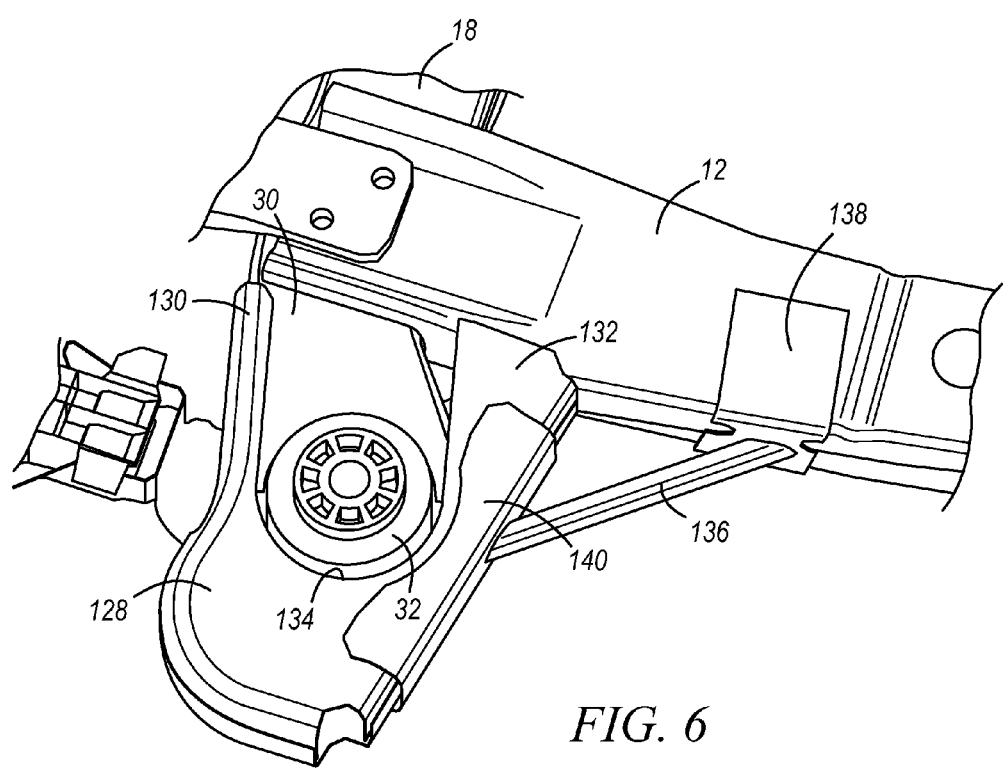
FIG. 6 shows yet another alternative construction of the deflector device.

Referring to FIG. 6, another embodiment of the invention is shown. In FIG. 6, an impact receiving member 128 is a generally U-shaped structure having a forward leg 130 and a rearward leg 132 straddling body mount 32 and cooperates to define a semicircular receptacle 134 that partially surrounds the body mount 32. The inboard end of the forward leg 130 is suitably welded to either the side member 12 or to the left end 30 of the front cross member 18. The forward leg 130 will receive the load from the pole 44. The rearward leg 132 is suitably welded to the side member 12 rearwardly of the forward leg 130 and thereby acts as a supplemental brace for bracing the forward leg 130. A brace member 136 extends diagonally between the rearward leg 132 and the side member 12 to brace the impact receiving member 128. As seen in FIG. 6, the brace member 136 is attached to the cradle 10 by a U-shaped bracket 138, and, in a similar manner, the forward end of the brace member 136 is attached to the rearward leg 132 by another U-shaped bracket 140. Loads imposed on the impact receiving member 128 are transferred into the cradle 10 rather than being imposed into the vehicle wheel 78 or other vehicle structures that lie outboard of the cradle 10.

Thus, it is seen that the invention provides a path for transference of impact loads into the engine cradle rather than into the vehicle wheel and other vehicle structures that lie generally outboard of the longitudinal extending side member of the engine cradle.

What is claimed is:

1. A cradle for mounting an engine in a vehicle having wheels located outboard of the cradle, said cradle comprising:
   left and right side members spaced laterally apart from one another on opposite sides of the engine and inboard of the wheels;
   a rear cross member having right and left ends attached respectively to the left and right side members;
   a front cross member having left and right ends attached respectively to the left and right side members;
   left and right vehicle body mounts provided respectively on the left and right ends of the front cross member for bolting to the vehicle body;
   left and right deflector devices mounted respectively on the cradle adjacent the left and right body mounts and forwardly of the vehicle wheels, each of the left and right deflector devices including an impact receiving member that projects outwardly from the cradle to receive an impact load that is offset outboard from the body mounts, said impact receiving member projecting outwardly from the cradle and extending rearwardly at an angle of between 30 degrees and 45 degrees from the front cross member and having an end positioned adjacent or outboard of the vehicle wheel, and a brace member that extends between the cradle and the impact receiving member to brace the impact receiving member and provide a load path transferring the impact load into the cradle, one of said impact receiving member and said brace member having a semicircular receptacle that closely surrounds the body mount.

2. The cradle of claim 1 further comprising the impact receiving member being situated forwardly of the front cross member.

3. The cradle of claim 1 further comprising the impact receiving member being situated in general alignment with the front cross member and not forwardly of the front cross member.

4. The cradle of claim 1 further comprising each of the left and right deflector devices having the impact receiving member projecting outwardly from the cradle and mounted on the cradle by a side member extension projecting forward from the side member and a brace member extending between an outboard end of the impact receiving member and the end of the front cross member.

5. The cradle of claim 1 further comprising the impact receiving member being situated in general alignment with the front cross member and not forwardly of the front cross member and the brace member extending diagonally between the impact receiving member and the side member at a location rearward of the front cross member.

6. The cradle of claim 1 further comprising a supplemental brace acting to supplement the brace member by bracing the impact receiving member and assisting in transferring the impact load into the cradle.

7. The cradle of claim 1 further comprising the impact receiving member and the brace members being constructed of metal tubes that are welded or bolted to one another and to the cradle.

8. The cradle of claim 1 further comprising the impact receiving member having an outboard end that projects outwardly beyond the location front wheel.

9. A cradle for mounting an engine in a vehicle having wheels located outboard of the cradle, said cradle comprising:
   left and right side members spaced laterally apart from one another on opposite sides of the engine and inboard of the wheels;
   a rear cross member having right and left ends attached respectively to the left and right side members;
   a front cross member having left and right ends attached respectively to the left and right side members;
   left and right vehicle body mounts provided respectively on the left and right ends of the front cross member for bolting to the vehicle body;
   left and right deflector devices mounted respectively on the cradle adjacent the left and right body mounts and forwardly of the vehicle wheels, each of the left and right deflector devices including a side member extension having a rear end attached to a front end of the side member, an impact receiving member having a forward end attached to a forward end of the side member extension, said impact receiving member projecting outwardly from the cradle and extending rearwardly at an angle of between 30 degrees and 45 degrees from the front cross member and having an end positioned adjacent or outboard of the vehicle wheel, and a brace member having an outboard end attached to the outboard end of the impact receiving member to brace the impact receiving member and provide a load path transferring the impact load into the cradle, and said brace member having a semicircular receptacle that partly surrounds the body mount and is attached to the respective end of the front cross member.

10. The cradle of claim 9 further comprising the brace member extending at an angle of 90 degrees with respect to the respective side member.

11. A cradle for mounting an engine in a vehicle having wheels located outboard of the cradle, said cradle comprising:
   left and right side members spaced laterally apart from one another on opposite sides of the engine and inboard of the wheels;
   a rear cross member having right and left ends attached respectively to the left and right side members;
   a front cross member having left and right ends attached respectively to the left and right side members;
   left and right vehicle body mounts provided respectively on the left and right ends of the front cross member for bolting to the vehicle body;
   left and right deflector devices mounted respectively on the cradle adjacent the left and right body mounts and forwardly of the vehicle wheels, each of the left and right deflector devices including an impact receiving member that attaches to the respective end of the front cross member and extends outwardly therefrom at an angle of between 30 degrees and 45 degrees from the front cross member to end outboard beyond the vehicle wheel, and a brace member that extends between the side member of the cradle and the impact receiving member to brace the impact receiving member and provide a load path transferring the impact load into the cradle, and one or both of the impact receiving member and the brace member partly surrounding the vehicle body mount.

12. The cradle of claim 11 further comprising the impact receiving member having a semicircular receptacle provided therein for partly surrounding the vehicle body mount.

13. The cradle of claim 11 further comprising the brace member having an outboard end attached to the impact receiving member and an inboard end attached to the side member of the cradle rearwardly of the front cross member.

14. The cradle of claim 11 further comprising the impact receiving member being generally U-shaped including a forward leg for receiving the impact and a rearward leg attached to the side member and providing supplemental bracing of the impact receiving member.

15. The cradle of claim 14 further comprising the forward leg and rearward leg straddling the vehicle body mount and defining a semicircular receptacle that partly surrounds the vehicle body mount.

* * * * *

UNITED STATES PATENT AND TRADEMARK OFFICE
CERTIFICATE OF CORRECTION

PATENT NO. : 8,480,130 B2  
APPLICATION NO. : 13/250325  
DATED : July 9, 2013  
INVENTOR(S) : Dandekar et al.

It is certified that error appears in the above-identified patent and that said Letters Patent is hereby corrected as shown below:

Title page, item [75] inventor: "Balbir Singh Sanga" should be -- Balbir Singh Sangha --.

Signed and Sealed this  
Fifth Day of November, 2013

Teresa Stanek Rea  
*Deputy Director of the United States Patent and Trademark Office*